United States Patent
Andrews et al.

(10) Patent No.: US 10,673,248 B2
(45) Date of Patent: Jun. 2, 2020

(54) HYBRID DISTRIBUTED LOW VOLTAGE POWER SYSTEMS

(71) Applicant: Eaton Intelligent Power Limited, Dublin (IE)

(72) Inventors: James Christopher Andrews, Mableton, GA (US); Kenneth Dale Walma, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/259,323

(22) Filed: Jan. 28, 2019

(65) Prior Publication Data

US 2019/0157878 A1  May 23, 2019

Related U.S. Application Data

(63) Continuation of application No. 15/098,909, filed on Apr. 14, 2016, now Pat. No. 10,193,351.

(60) Provisional application No. 62/147,199, filed on Apr. 14, 2015.

(51) Int. Cl.
| | | |
|---|---|---|
| *H02J 4/00* | (2006.01) | |
| *H02J 9/06* | (2006.01) | |
| *H02G 3/00* | (2006.01) | |

(52) U.S. Cl.
CPC ............... *H02J 4/00* (2013.01); *H02J 9/061* (2013.01); *H02G 3/00* (2013.01)

(58) Field of Classification Search
USPC .......................................................... 307/24
See application file for complete search history.

(56) References Cited

U.S. PATENT DOCUMENTS

| | | |
|---|---|---|
| 6,198,250 B1 | 3/2001 | Gartstein |
| 2007/0200433 A1 | 8/2007 | Kelty |
| 2008/0197790 A1 | 8/2008 | Mangiaracina |
| 2010/0244573 A1 | 9/2010 | Karnick et al. |
| 2012/0280673 A1* | 11/2012 | Watanabe ............. H02J 3/1885 323/304 |
| 2013/0328397 A1* | 12/2013 | Lee .......................... H02J 3/32 307/23 |
| 2014/0001977 A1 | 1/2014 | Zacharchuk |
| 2014/0183949 A1* | 7/2014 | Murano .................... G05F 1/67 307/24 |
| 2015/0081127 A1 | 3/2015 | Bhageria |
| 2015/0180230 A1 | 6/2015 | Xu |

* cited by examiner

*Primary Examiner* — Rexford N Barnie
*Assistant Examiner* — Xuan Ly
(74) *Attorney, Agent, or Firm* — King & Spalding LLP

(57) ABSTRACT

A hybrid distributed low voltage power system can include a first primary power source that distributes line voltage power during a first mode of operation. The system can also include a first secondary power source that receives an input signal during the first mode of operation and distributes a reserve signal during the second mode of operation, where the reserve signal is generated from the input signal. The system can further include a PDM coupled to the first primary power source and the first secondary power source. The system can also include at least one first LV device coupled to the first output channel of the PDM, where the at least one LV device operates using the first LV signal during the first mode of operation, and where the at least one first LV device receives a reserve LV signal during the second mode of operation.

20 Claims, 4 Drawing Sheets

HYBRID DISTRIBUTED LOW VOLTAGE POWER SYSTEMS

CROSS REFERENCE TO RELATED APPLICATIONS

The present application is a continuation application of and claims priority under 35 U.S.C. § 120 to U.S. patent application Ser. No. 15/098,909, titled "Hybrid Distributed Low Voltage Power Systems" and filed on Apr. 14, 2016, which claims priority to U.S. Provisional Patent Application No. 62/147,199, filed on Apr. 14, 2015, and titled "Hybrid Distributed Low Voltage Power Systems." The entire content of the foregoing applications is hereby incorporated herein by reference.

TECHNICAL FIELD

Embodiments described herein relate generally to power distribution systems, and more particularly to systems, methods, and devices for hybrid low voltage power distribution systems.

BACKGROUND

Certain devices (e.g., light-emitting diode (LED) fixtures) within distributed power systems can operate on different types (e.g., direct current (DC), alternating current (AC)) and/or amounts (e.g., 24V, 2A, 120V, 50 mA) of power relative to the type and amount of power that feeds the distributed power system. Further, the devices receiving power from the device distributing the power within the distributed power system can be located relatively close to such power distribution device.

SUMMARY

In general, in one aspect, the disclosure relates to a hybrid distributed low voltage power system that can include a first primary power source that distributes line voltage power during a first mode of operation and fails to distribute the line voltage power during a second mode of operation. The system can also include a first secondary power source that receives an input signal during the first mode of operation and distributes a reserve signal during the second mode of operation, where the reserve signal is generated from the input signal. The system can further include a power distribution module (PDM) coupled to the first primary power source and the first secondary power source, where the PDM includes a first power transfer device and a first output channel, where the PDM receives the line voltage power from the first primary power source during the first mode of operation, and where the first power transfer device generates a first low-voltage (LV) signal using the line voltage power during the first mode of operation. The system can also include at least one first LV device coupled to the first output channel of the PDM, where the at least one LV device operates using the first LV signal generated by the PDM during the first mode of operation, and where the at least one first LV device receives a reserve LV signal based on the reserve signal during the second mode of operation.

In another aspect, the disclosure can generally relate to a secondary power source that can include at least one input channel configured to receive an input signal from a primary power source. The secondary power source can also include a storage portion coupled to the at least one input channel, where the storage portion stores the input signal, where the storage portion converts the input signal to a reserve signal. The secondary power source can further include at least one output channel coupled to the storage portion and device power distribution module (PDM), where the at least one output channel is configured to deliver the reserve signal to the PDM for use by at least one LV device.

In yet another aspect, the disclosure can generally relate to a power distribution module (PDM) that can include an input channel configured to receive a line voltage power from a primary power source during a first mode of operation. The PDM can also include a secondary channel configured to receive a reserve signal from a secondary power source during a second mode of operation. The PDM can further include a power transfer device coupled to the input channel and the secondary channel, where the power transfer device generates a low voltage (LV) signal using the line voltage power during the first mode of operation, and where the power transfer device generates a reserve LV signal using the reserve signal during the second mode of operation. The PDM can also include an output channel coupled to the power transfer device, where the output channel is configured to send the LV signal to at least one first LV device during the first mode of operation, and where the output channel is configured to send the reserve LV signal to the at least one first LV device during the second mode of operation.

These and other aspects, objects, features, and embodiments will be apparent from the following description and the appended claims.

BRIEF DESCRIPTION OF THE DRAWINGS

The drawings illustrate only example embodiments of hybrid distributed low voltage power systems and are therefore not to be considered limiting of its scope, as hybrid distributed low voltage power systems may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1A:
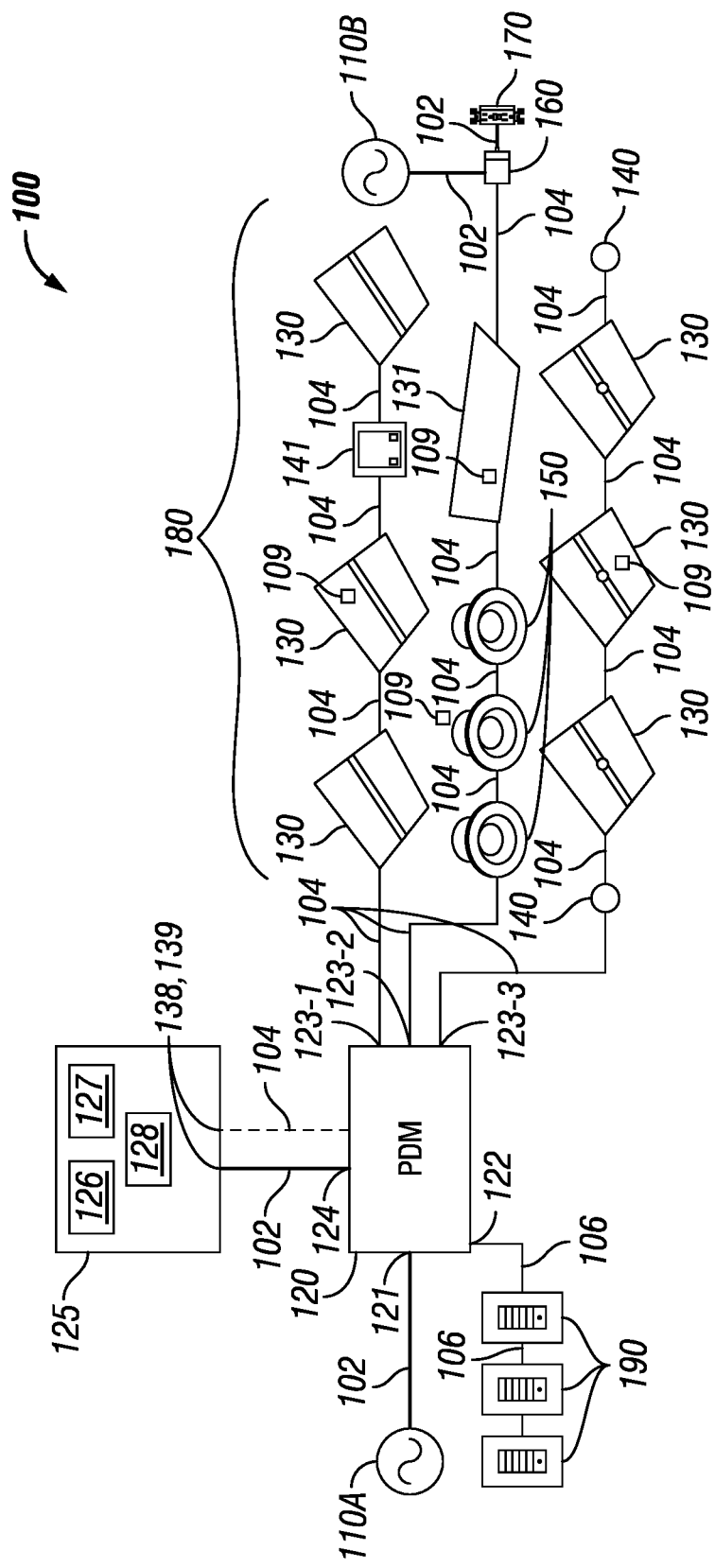
FIGS. 1A and 1B show a system diagram of a hybrid distributed low voltage power system in accordance with certain example embodiments.

The example embodiments discussed herein are directed to systems, apparatuses, and methods of hybrid distributed low voltage power systems. While example embodiments described herein are directed to use with lighting systems, example embodiments can also be used in systems having other types of devices. Examples of such other systems can include, but are not limited to, security systems, fire protection systems, emergency management systems, and assembly systems. Thus, example embodiments are not limited to use with lighting systems.

Example embodiments can be used with one or more of any number of low voltage system infrastructures. For instance, example embodiments can use Ethernet cables coupled to output channels of a power-over-Ethernet (POE) switch, where the PDM (defined below) acts as the POE switch. As another example, the PDM can serve as a gateway, where multiple devices are connected to the output channels of the PDM. In this way, the PDM can act as a point-of-load (POL) controller, described below. As yet another example, the PDM can cat as a gateway, which in turn can cause the PDM to act as a POL controller.

As defined herein, a mode of operation is defined by certain factors existing or not existing and/or by certain components of an example system described herein operating or not operating. For example, a first mode of operation can be defined when a primary power source delivers line voltage power, and a second mode of operation can be defined when the primary power source fails to deliver line voltage power. As another example, a first mode of operation can be defined during "off peak" hours when power prices are relatively low, and a second mode of operation can be defined during "peak" hours when power prices are relatively high.

As described herein, a user can be any person that interacts with example hybrid distributed low voltage power systems. Examples of a user may include, but are not limited to, a consumer, an electrician, an engineer, a mechanic, a pipe fitter, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In certain example embodiments, the hybrid distributed low voltage power systems (or portions thereof) described herein meet one or more of a number of standards, codes, regulations, and/or other requirements established and maintained by one or more entities. Examples of such entities include, but are not limited to, Underwriters' Laboratories, the Institute of Electrical and Electronics Engineers, and the National Fire Protection Association. For example, wiring (the wire itself and/or the installation of such wire) that electrically couples an example PDM (defined below) with a device may fall within one or more standards set forth in the National Electric Code (NEC). Specifically, the NEC defines Class 1 circuits and Class 2 circuits under various Articles, depending on the application of use.

Class 1 circuits under the NEC typically operate using line voltages (e.g., between 120 V alternating current (AC) and 600 VAC). The wiring used for Class 1 circuits under the NEC must be run in raceways, conduit, and enclosures for splices and terminations. Consequently, wiring for Class 1 circuits must be installed by a licensed electrical professional. By contrast, Class 2 circuits under the NEC typically operate at lower power levels (e.g., up to 100 VAC, no more than 60 V DC). The wiring used for Class 2 circuits under the NEC does not need to be run in raceways, conduit, and/or enclosures for splices and terminations. Specifically, the NEC defines a Class 2 circuit as that portion of a wiring system between the load side of a Class 2 power source and the connected equipment. Due to its power limitations, a Class 2 circuit is considered safe from a fire initiation standpoint and provides acceptable protection from electrical shock. Consequently, wiring for Class 2 circuits may not need to be installed by a licensed electrical professional.

As another example, the International Electrotechnical Commission (IEC) sets and maintains multiple standards and categorizations of electrical supply for a system. One such categorization is separated or safety extra-low voltage (SELV), which is an electrical system in which the voltage cannot exceed 25 V AC RMS (root-mean-square) (35 V AC peak) or 60 V DC under dry, normal conditions, and under single-fault conditions, including earth faults in other circuits. Another such categorization is protected extra-low voltage (PELV), which is an electrical system in which the voltage cannot exceed 25 V AC RMS (root-mean-square) (35 V AC peak) or 60 V DC under dry, normal conditions, and under single-fault conditions, except earth faults in other circuits. Yet another such categorization is functional extra-low voltage (FELV), which is an electrical system in which the voltage cannot exceed 25 V AC RMS (root-mean-square) (35 V AC peak) or 60 V DC under normal conditions.

Example embodiments of hybrid distributed low voltage power systems will be described more fully hereinafter with reference to the accompanying drawings, in which example embodiments of hybrid distributed low voltage power systems are shown. Hybrid distributed low voltage power systems may, however, be embodied in many different forms and should not be construed as limited to the example embodiments set forth herein. Rather, these example embodiments are provided so that this disclosure will be thorough and complete, and will fully convey the scope of hybrid distributed low voltage power systems to those of ordinary skill in the art. Like, but not necessarily the same, elements (also sometimes called components) in the various figures are denoted by like reference numerals for consistency.

Terms such as "first" and "second" are used merely to distinguish one component (or part of a component or state of a component) from another. Such terms are not meant to denote a preference or a particular orientation. Also, the names given to various components described herein are descriptive of one or more embodiments and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

Figure 1B:
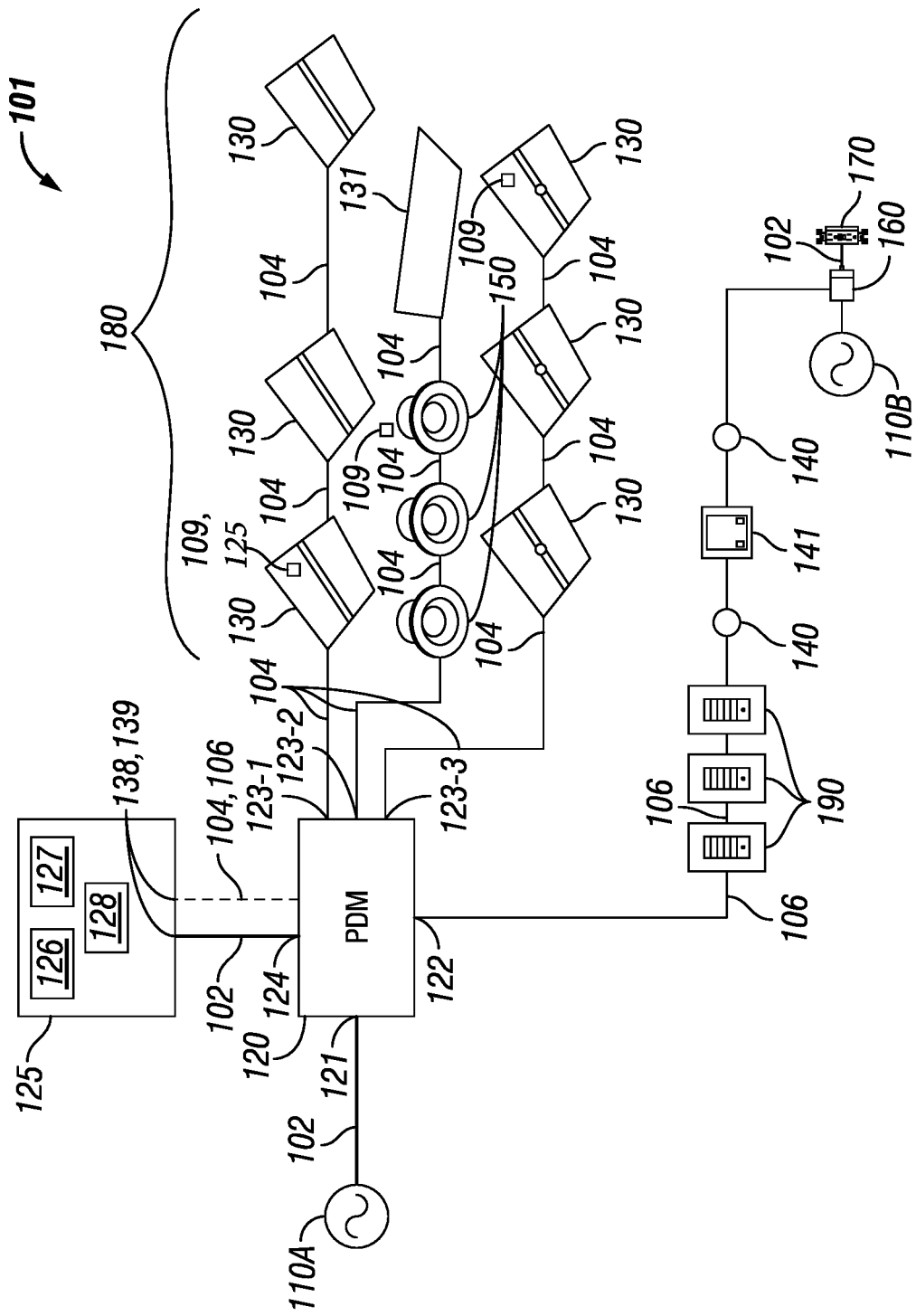

FIGS. 1A and 1B each shows a system diagram of a hybrid distributed power system 100 and system 101, respectively, in accordance with certain example embodiments. The system 100 of FIG. 1A and the system 101 of FIG. 1B includes, in varying degrees of configuration, at least one (in this case, two) primary power source 110, at least one power distribution module 120 (PDM 120), at least one secondary power source 125 (also called a storage device 125), at least one (in this case, seven) troffer light 130, at least one (in this case, three) can light 150, at least one (in this case, one) sensing device 140 (e.g., motion sensor), at least one (in this case, one) inverter 160, at least one (in this case, one) wall outlet 170, at least one (in this case, one) photocell/timer 141, and at least one (in this case, three) external controller 190. An external controller 190 can also be called by other names, including but not limited to a master controller and a network manager. An external controller 190 can be coupled to any of a number of PDMs and/or other components in any of a number of systems.

Operational components of system 100, system 101, or any system described herein, such as the troffer lights 130, the can lights 150, and the sensing devices 140, are referred to generally herein as LV devices 180 (also called "devices" or "downstream devices"). As defined herein, a LV device 180 can be any device coupled to an output channel of the PDM 120 to receive LV signal from the PDM 120. In this case, the LV devices 180 include the troffer lights 130, the can lights 150, the controllers 190, the inverter 160, the wall outlet 170, the photocell/timer 141, and the sensing device 140. The system 100 and system 101 can be a hybrid system because there is a primary power source 110 and at least one secondary power source 125.

Each of these components of the system 100 and system 101 are electrically coupled to at least one other component of the system 100 and system 101 using wired and/or wireless technology. For example, primary power source 110A and primary power source 110B are coupled to the PDM 120 and the inverter 160, respectively, by one or more line voltage cables 102. As another example, the secondary power source 125 are coupled to at least one troffer light 130 using one or more low voltage (LV) cables 104. As yet another example, the PDM 120 can be coupled to the external controller 190 using one or more communication links 106. Each of these wired technologies will be discussed below in more detail.

A sensing device 140 can be any LV device 180 that detects one or more conditions (e.g., motion, light, sound). Examples of a sensing device 140 can include, but are not limited to, a photocell, a motion detector, an audio detector, a pressure detector, a temperature sensor, and an air flow sensor. The controller 190 can be any LV 180 device that controls one or more of the other LV devices 180 in the system 100. Examples of a controller 190 can include, but are not limited to, a thermostat, a dimmer switch, a control switch, a control panel, and a power switch.

The controller 190 of FIGS. 1A and 1B can communicate with (e.g., send instructions to, receive data about one or more LV devices 180 from) the PDM 120 and/or a power source (e.g., secondary power source 125). Instructions sent by the controller 190 to the PDM 120 can affect the operation of all LV devices 180 coupled to one or more particular channels of the PDM 120, particular LV devices 180 coupled to one or more particular channels of the PDM 120, or any combination thereof. Communication between the PDM 120, the controller 190, and the controllers in one or more LV devices 180 of the system 100 can include the transfer (sending and/or receiving) of data. Communications between the PDM 120, the controller 190, and/or a LV device 180 (e.g., the troffer lights 130, the can lights 150, the controller 190, a secondary power source 125) can be made through the LV cables 104 and/or the communication link 106, using wired and/or wireless technology.

Such data can include instructions, status reports, notifications, and/or any other type of information. Specific examples of data and/or instructions sent between the PDM 120, the controller 190, and/or a LV device 180 (e.g., the troffer lights 130, the can lights 150, the controller 190, the sensing device 140, a secondary power source 125) can include, but are not limited to, delivery of power signals (e.g., LV signals) to one or more LV devices 180, a light level, a light fade rate, a demand response, occupancy of an area, detection of daylight, a security override, a temperature, a measurement of power, a measurement or calculation of power factor, operational status, a mode of operation, a dimming curve, a color and/or correlated color temperature (CCT), a manual action, manufacturing information, performance information, warranty information, air quality measurements, upgrade of firmware, update of software, position of a shade, and a device identifier.

Each primary power source 110 (e.g., primary power source 110A, primary power source 110B) generates and/or delivers, directly or indirectly, electrical power that is a higher voltage than the voltage ultimately used by the various LV devices 180 (e.g., light troffers 130, can lights 150, sensing devices 140) in the system 100. The power generated or delivered by the primary power source 110 can be called line voltage power or input power. The line voltage power can be power that is delivered to a house, building, or other similar structure that supplies electricity located within or proximate to such structure.

A primary power source 110 can also generate DC power. Examples of voltages generated by a primary power source 110 can include 120 VAC, 240 VAC, 277 VAC, 24 VDC, 480 VDC, and 480 VAC. If the line voltage power is AC power, the frequency can be 50 Hz, 60 Hz, or some other frequency. Examples of a primary power source 110 can include, but are not limited to, a battery, a photovoltaic (PV) solar panel, a wind turbine, a power capacitor, an energy storage device, a power transformer, a fuel cell, a generator, and a circuit panel. As defined herein, a line voltage includes any of a number of voltages that is typically at least as great as the maximum LV signal (described below), and that is typically a nominal service voltage such as 120 VAC, 277 VAC, or 480 VDC.

The line voltage power is sent, directly or indirectly, from a primary power source 110 to one or more other components (e.g., a PDM 120, a secondary power source 125) of the system 100 and the system 101 using the line voltage cables 102. The line voltage cables 102 can include one or more conductors made of one or more electrically conductive materials (e.g., copper, aluminum). The size (e.g., gauge) of the line voltage cables 102 (and/or conductors therein) are sufficient to carry the line voltage power of the primary power source 110. Each line voltage cable 102 may be coated with an insulator made of any suitable material (e.g., rubber, plastic) to keep the electrical conductors electrically isolated from any other conductor in the line voltage cable 102.

In certain example embodiments, one or more of the LV devices 180 (in this case, the light troffers 130, the can lights 150, the sensing device 140, and the controller 190) in the system 100 and system 101 use an amount and/or type (e.g., DC, AC) of power that is different from the amount and type of line voltage power generated by a primary power source 110. For example, the line voltage power generated by a primary power source 110 can be AC power, and the LV devices 180 of the system 100 and system 101 require DC power to operate. In such a case, the PDM 120 and/or a secondary power source 125 can be used between the primary power sources 110 and the LV devices 180. In this way, the PDM 120 and/or the secondary power source 125 can convert the input power (the line voltage power) to low-voltage (LV) power (also called a LV signal), where the LV power can be used by the various downstream LV devices 180. As defined herein, a LV signal has a voltage that does not exceed approximately 42.4 VAC (root mean square) or 60 VDC.

In the system 100 shown in FIG. 1A and the system 101 of FIG. 1B, the portions of the system 100 and the system 101 that involve the LV power are classified as a "safe" system under currently-existing standards and/or regulations. For example, the LV power portions of the system 100 and system 101 can be considered a NEC Class 2 system. As another example, the LV power portions of the system 100 and system 101 can be considered free from risk of fire and/or electrical shock.

In many typical systems known in the art, one or more of the downstream LV devices 180 (e.g., troffer light 130, can light 150, sensing device 140) can include a power transfer device because such LV devices 180 receive the input power (or other power) from a component (e.g., primary power source 110A) of the system 100 and system 101 where the power is of a type and/or amount that is different from that of the power used by the LV device 180. Using example embodiments, the downstream LV devices 180 may not require a power transfer device because the power that each of these LV devices 180 receive is LV power (also called a LV signal) in a type and amount (e.g., 100 W, 48 VDC) used by such LV devices 180.

In certain example embodiments, as shown in FIGS. 1A and 1B, one or more of the LV devices 180 can include or be coupled to a power transfer device that receives the LV signal and generates, using the LV signal, a level and type of power used by the LV device 180. As a result, such LV devices 180 can have a point-of-load POL controller 109 (also called, for example, a driver or a ballast). The POL controller 109 is usually located within a housing of the LV device 180 and is designed to receive a LV signal. When a LV signal is received by the POL controller 109, the POL controller 109 provides power regulation and control to the LV device 180. In other words, a POL controller 109 can perform one or more of a number of functions. Such functions can include, but are not limited to, receiving instructions (as from the PDM 120), collecting and recording operational data, recording communications with the PDM 120 and/or other devices, and sending operational data to the PDM 120 and/or other devices.

The example downstream LV devices 180 (e.g., the troffer lights 130, the can lights 150, the controllers 190, the sensing device 140, the inverter 160, the wall outlet 170, the photocell/timer 141) shown in FIGS. 1A and 1B and described herein are not meant to be limiting. Examples of other LV devices 180 that can receive and use (directly or indirectly) LV signals from the PDM 120 and/or a secondary power source 125 can include, but are not limited to, a power source (e.g., a LED driver, a ballast, a buck converter, a buck-boost converter), a controller (e.g., a pulse width modulator, a pulse amplitude modulator, a constant current reduction dimmer), a keypad, a touchscreen, a dimming switch, a thermostat, a shade controller, a universal serial bus charger, and a meter (e.g., water meter, gas meter, electric meter).

The LV devices 180 (in this case, the troffer lights 130, the can lights 150, the controllers 190, the inverter 160, the wall outlet 170, the photocell/timer 141, and the sensing device 140) of FIGS. 1A and 1B are each electrically coupled, directly or indirectly, to the PDM 120 and, at least in some cases, at least one secondary power source 125. The PDM 120 of FIGS. 1A and 1B is electrically coupled to the primary power source 110 using the line voltage cable 102. The PDM 120 can include a power transfer device that generates, using the power delivered by the primary power source 110, one or more of a number of LV signals for some or all of the other LV devices 180 (e.g., the troffer lights 130, the can lights 150, the sensing device 140, secondary power source 125) in the system 100 and system 101. Examples of a power transfer device can include, but are not limited to, a transformer, an inverter, and a converter. The PDM 120 can have an input portion, an output portion, and the power transfer device. The power transfer device of the PDM 120 can be essentially the same as the power transfer device described above for each of the downstream LV devices 180 in the system 100 of FIG. 1A and system 101 of FIG. 1B.

In certain example embodiments, the PDM 120 includes one or more (in this case, one) input channels 121 that receive the line voltage power from one or more primary power sources 110. The PDM 120 can also include one or more (e.g., one, two, five, ten) output channels 123, where each output channel 123 (also called an outlet channel) of the PDM 120 delivers a LV signal for use by one or more LV devices 180 that are electrically coupled to that output channel 123 of the PDM 120.

The amount and/or type of power of the LV signal of one output channel can be substantially the same as, or different than, the amount and/or type of power of the LV signal of another output channel 123 of the PDM 120. For example, each output channel 123 of the PDM 120 can output 100 W, 48 VDC of power (also called the LV signal). The LV signals delivered by an output channel 123 of the PDM 120 can be at a constant level and/or a variable level. The LV signals can change a state (e.g., on, off, dim, standby) of one or more LV devices 180. In addition, or in the alternative, the LV signal can include transferred data (e.g., instructions, requests, information, status).

There can be other channels of the PDM 120 that can serve as input channels and/or output channels. For example, in this case, the PDM 120 includes one or more channels 122 that are coupled to one or more controllers 190 and/or other LV devices 180, as described below. As another example, also in this case, the PDM 120 includes one or more channels 124 that are coupled to and receive reserve line voltage from one or more secondary power sources 125, also as described below.

In certain example embodiments, such as the system 100 of FIG. 1A, one or more LV cables 104 are used to electrically couple, directly or indirectly, one or more of the LV devices 180 (e.g., the troffer lights 130, the can lights 150, the sensing device 140, the secondary power source 125) in the system 100 and the system 101 to the PDM 120. The LV cables 104 can have one or more pairs of conductors. Each pair of conductors of the LV cable 104 can deliver LV signals that represent power signals and/or communication signals. In some cases, a LV cable 104 has at least one pair of conductors that carries power signals and at least one pair of conductors that carries control signals. The LV cables 104 can be plenum rated. For example, one or more of the LV cables 104 can be used in drop ceilings without conduit or cable trays.

The PDM 120 can also have a communication link 106 with one or more controllers 190. In the examples of FIGS. 1A and 1B, the communication link 106 is coupled to channel 122 of the PDM 120. The communication link 106 can be LV cable, Ethernet cable, a RS45 cable, and/or some other wired technology. In addition, or in the alternative, the communication link 106 can be a network using wireless technology (e.g., Wi-Fi, Zigbee, 6LoPan). As described below, one or more communication links 106 can also be coupled to one or more output channels 123 of the PDM 120, so that the communication links 106, in place of the LV cables 104, deliver LV power to one or more of the LV devices 180.

The controller 190 can be communicably coupled to one or more other systems in addition to the PDM 120 of the system 100 and the system 101. Similarly, the PDM 120 can be coupled to one or more other PDMs in one or more other systems. The system 100 and the system 101 can have multiple PDMs 120, where each PDM 120 provides LV power and communicates (sends and receives data) with one or more devices.

In some cases, such as with the system 101 of FIG. 1B, a controller 190 can be coupled to one or more other components of the system 101 using communication link 106. Examples of such other components can include, but are not limited to, one or more LV devices 180 (in the case of FIG. 1B, sensing devices 140, photocell/timer 141, and inverter 160). As yet another alternative, one or more components (e.g., sensing devices 140, photocell/timer 141, and inverter 160) of a system (e.g., system 100, system 101) can interface with other components of the system through a low voltage control interface rather than a direct connection to each so that existing low voltage components (e.g., LV devices 180) can be used.

In certain example embodiments, the PDM 120 can include communication and diagnostic capabilities. Communications can be with the controller 190, one or more secondary power sources 125, one or more downstream LV devices 180, other PDMs 120 in the system 100 and/or the system 101, a user device, and/or any other component of the system 100 and/or the system 101. Diagnostic capabilities can be for operations of the system 100 and/or the system 101 overall, for operations of the PDM 120, for operations of one or more devices (e.g., secondary power source 125) coupled to the PDM 120, for operations of one or more other PDMs in the system 100 and/or the system 101, and/or for any other components of the system 100 and/or the system 101.

Each secondary power source 125 of FIGS. 1A and 1B can be electrically coupled to one or more of a number of components of the system 100 and/or the system 101. For example, as shown in FIGS. 1A and 1B, a secondary power source 125 can be electrically coupled to the PDM 120. Specifically, the secondary power source 125 of FIGS. 1A and 1B is coupled to channel 124 of the PDM 120. As another example, as shown in FIG. 1B, a secondary power source 125 can be integrated with (e.g., disposed within a housing of) a LV device 180 (e.g., a troffer light 130). A secondary power source 125 can be electrically coupled to another component of the system 100 and/or the system 101 using wired and/or wireless technology. For example, in this case, the secondary power source 125 can be electrically coupled to the channel 124 of the PDM 120 using a line voltage cable 102 or, optionally, a LV cable 104. Any power delivered by a secondary power source 125 can be called reserve power.

In certain example embodiments, the secondary power source 125 serves only to store power that it receives. As shown in FIGS. 1A and 1B, the secondary power source 125 can receive line voltage power from the PDM 120 and store the line voltage power as reserve power in one or more storage components 126, described below. At a later time (e.g., when the primary power source 110 stops delivering primary power, as during a power outage), the secondary power source 125 can then release the reserve power through the line voltage cable 102 back to the PDM 120. Alternatively, the secondary power source 125 can receive LV signals from the PDM 120 and store the LV signals as reserve power in the one or more storage components 126. At a later time, the secondary power source 125 can then release the stored LV signals as reserve power through the LV cable 104 back to the PDM 120. In this way, the secondary power source 125 can provide reserve power to the PDM 120 in lieu of the primary power provided by the primary power source 110A.

Figure 2:
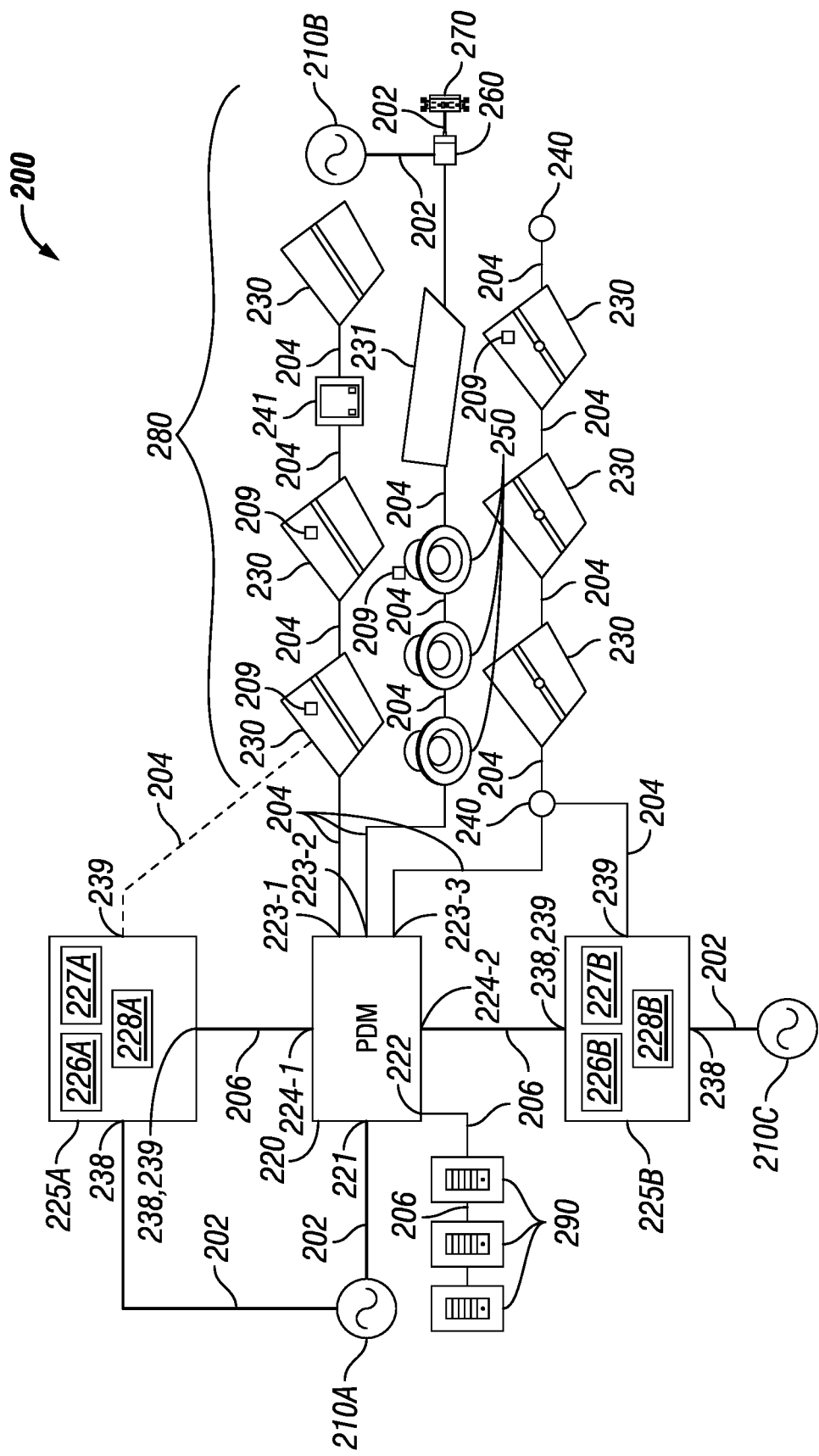
FIG. 2 shows a system diagram of another hybrid distributed low voltage power system in accordance with certain example embodiments.

In certain example embodiments, as shown in FIG. 2 below, the secondary power source 125 receives power (e.g., input power) from one component (e.g., primary power source 110, PDM 120) of the system (e.g., system 100, system 101), generates one or more of a number of LV signals based on the power received, and sends the LV signals to one or more other LV devices 180 (e.g., troffer lights 130, can lights 150, sensing device 140) in the system. Consequently, the secondary power source 125 can have an input portion, an output portion, and an optional power transfer device 128. The power transfer device 128 of the secondary power source 125 can be essentially the same as the power transfer device described above for the PDM 120. In some cases, such as shown in FIGS. 1A and 1B, the input portion and the output portion of the secondary power source 125 can be the same.

In certain example embodiments, the input portion of the secondary power source 125 receives (directly or indirectly) line voltage power from the primary power source 110. An example of how the secondary power source 125 receives line voltage power is shown in FIGS. 1A and 1B, where line voltage power is generated by the primary power source 110, sent to the PDM 120 at input channel 121, and the PDM 120 sends the line voltage power through channel 124 to the secondary power source 125.

In some cases, the secondary power source 125 has a storage component 126. In such a case, the storage component 126 can store power for use at a later time. The storage component 126 of a secondary power source 125 can be a single storage component of a number of storage components that can be networked with and/or independent of each other. The storage component 126 can have a capacity, which represents the maximum amount of power that the storage component 126 can store at a given time. The power stored by the storage component 126 of the secondary power source 125 can be the line voltage power (or other power received by the input portion of the secondary power source 125) and/or a LV signal.

The storage component 126 of a secondary power source 125 can have a variable charge rate. In other words, the power received in the storage component 126 can be stored at different rates. These different rates of storing power in the storage component 126 can vary based on one or more of a number of factors, including but not limited to a user setting, a level and type of power, a time of day, a current level of charge relative to the capacity of the storage component 126, a default setting, an amount of time charging, and whether a storage threshold has been met. Storing and discharging power can be called modes of operation.

In certain example embodiments, the storage component 126 of a secondary power source 125 can intelligently store power to prolong the useful life of the storage component 126 of the secondary power source 125. For example, the secondary power source 125 can include a controller 127 that is coupled to the storage component 126. In such a case, the controller 127 can control the storage component 126 based on one or more storage thresholds (in other words, levels of power storage of the storage component 126 relative to the capacity of the storage component 126). For example, the controller 127 can prevent the storage component 126 from accepting additional power when the storage component 126 is at 95% of capacity (corresponding, for example, to a high storage threshold), and the controller 127 can allow the storage component 126 to accept additional power when the storage component 126 is at 25% of capacity (corresponding, for example, to a low storage threshold).

As a specific example, a controller 127 can allow the storage component 126 to output the power stored to the output of the secondary power source 125 to be sent to the downstream device through the PDM 120 between 10:00 p.m. and 6:00 a.m., and the controller 127 can prevent the storage component 126 to output the power stored to the output of the secondary power source 125 at all other times, except when the primary power source 110 is unavailable (e.g., is in an outage).

If thresholds or other similar features are used to aid the controller 127 to control the storage component 126, such thresholds or other similar features can be established and/or changed by a user, by default, by the occurrence of some event (e.g., the number of times a particular threshold is reached, the passage of time), and/or by some other factor. In certain example embodiments, the storage component 126 of a secondary power source 125 can be removable and replaceable.

In some cases, rather than being part of the secondary power source 125, the controller can be part of a PDM 120, another secondary power source, an enterprise controller residing on an external server, and/or some other device in the system and/or in another system coupled to the system. As yet another alternative, multiple controllers can exist in a system and control a particular storage component 126 of a particular secondary power source 125. In such a case, there can be a hierarchy among the multiple controllers, such that one controller (e.g., a controller of a PDM 120) can override another controller (e.g., a controller 127 of a secondary power source 125) under certain conditions. In any case, the controller 127 can control any technology used by a storage component 126 of a secondary power source 125.

The storage component 126 of a secondary power source 125 can use one or more of any type of storage technology, including but not limited to a battery, a flywheel, an ultra-capacitor, and a supercapacitor. If the storage component 126 includes a battery, the battery technology can vary, including but not limited to lithium ion, lead/acid, solid state, graphite anode, titanium dioxide, nickel cadmium, nickel metal hydride, nickel iron, and lithium polymer.

If the secondary power source 125 includes a power transfer device 128, the storage component 126 can be used for power that is fed into and/or generated by the power transfer device 128. In certain example embodiments, a secondary power source 125 receives LV power (in addition to or in the alternative of line voltage power or some other form of power), stores the LV power, and subsequently sends the LV power to one or more devices in the system.

The output portion of the secondary power source 125 can include one or more (e.g., one, two, five, ten) input channels 138 and one or more output channels 139, where each input channel 138 (also called an inlet channel) of the secondary power source 125 receives one or more signals (also called input signals), and each output channel 139 (also called an outlet channel) of the of the secondary power source 125 delivers one or more reserve signals. As an example, a signal delivered by the secondary power source 125 can be reserve line voltage power that takes the place of the line voltage power delivered by the primary power source 110 when delivery of the line voltage power by the PDM 120 is interrupted. In such a case, the secondary power source 125 can receive (directly or indirectly from the primary power source 110) and store line voltage power (an input signal) to generate the reserve line voltage power.

As another example, a signal delivered by the secondary power source 125 can be a reserve LV signal that takes the place of the LV signal delivered by the PDM 120 when delivery of the LV signal by the PDM 120 is interrupted. In such a case, the secondary power source 125 can receive and store the LV signal (an input signal) to generate the reserve LV signal. In this example, the secondary power source 125 can deliver the reserve LV signal to the PDM 120 and/or to one or more of the LV devices 180. In the latter case, one or more LV devices 180 of the system (e.g., system 100, system 101) can be electrically coupled to one or more output channels 139 of the secondary power source 125.

The amount and/or type of power of the LV signal of one output channel 139 of the secondary power source 125 can be substantially the same as, or different than, the amount and/or type of power of the LV signal of another output channel 139 of the secondary power source 125. For example, each output channel 139 of the secondary power source 125 can output 100 W, 48 VDC of power (also called the LV signal). The LV signals delivered by an output channel 139 of the secondary power source 125 can be at a constant level and/or a variable level. The LV signals can change a state (e.g., on, off, dim, standby) of one or more LV devices 180. In addition, or in the alternative, the LV signal can include transfer of data (e.g., instructions, requests, information, status).

As yet another example, a secondary power source 125 can include some of the capabilities (e.g., power transfer device) of the PDM 120. For instance, a secondary power source 125 can receive and store line voltage power (an input signal) from a primary power source 110. When delivery of the line voltage power to the PDM 120 is interrupted, the secondary power source 125 can apply its reserve line voltage power to an internal power transfer device, generating one or more reserve LV signals. In such a case, the secondary power source 125 can send the reserve LV signals to the PDM 120 or directly to one or more LV devices 180.

In certain example embodiments, one or more LV cables 104 and/or communication links 106 are used to electrically couple, directly or indirectly, one or more of the downstream LV devices 180 (e.g., the troffer lights 130, the can lights 150, the sensing device 140) in the system to the secondary power source 125. The LV cables 104 can have one or more pairs of conductors. Each pair of conductors of the LV cable 104 (as described above) can deliver LV signals that represent power signals and/or communication signals. In addition, or in the alternative, the secondary power source 125 can be coupled to one or more downstream devices using line voltage cable 102, a communication link 106, and/or any other communication device.

The secondary power source 125 can also have a communication link 106 (as described above) that couples to one or more controllers 190. The secondary power source 125 can be coupled to one or more other PDMs in one or more other systems. The system 100 and/or the system 101 can have multiple secondary power sources 125, where each secondary power source 125 provides LV power (or some other type of power) and communicates (sends and receives data) with one or more downstream devices.

In certain example embodiments, each secondary power source 125 can include communication and diagnostic capabilities (as described above). Communications can be with the controller 190, one or more other secondary power sources 125, one or more primary power sources 110, one or more downstream LV devices 180, one or more PDMs 120, a user device, and/or any other component of the system 100 and/or the system 101 (or in another system coupled to the system 100 and/or the system 101).

The PDM 120, the controller 190, the secondary power sources 125, and/or the POL controllers 109 of one or more LV devices 180 can include a hardware processor-based component that executes software instructions using integrated circuits, discrete components, and/or other mechanical and/or electronic architecture. In addition, or in the alternative, the PDM 120, a controller 190, a secondary power source 125, and/or the POL controllers 109 of one or more LV devices 180 can include one or more of a number of non-hardware-based components. An example of such a non-hardware-based components can include one or more field programmable gate arrays (FPGA). Using FPGAs, integrated circuits, and/or other similar devices known in the art allows the PDM 120, a controller 190, a secondary power source 125, and/or the POL controllers 109 of one or more LV devices 180 to be programmable and function according to certain logic rules and thresholds without the use, or with limited use, of a hardware processor.

The PDM 120 and/or a secondary power source 125 can also have one or more of a number of other hardware and/or software components, including but not limited to a storage repository, memory, an application interface, and a security module. Similarly, the controller 190 and/or the POL controller 109 of one or more LV devices 180 in the system can include one or more software and/or hardware components, including but not limited to those listed above for the PDM 120 and one or more secondary power sources 125.

Communications between the PDM 120, the controller 190, and/or a LV device 180 (e.g., secondary power source 125, the troffer lights 130, the can lights 150, the controller 190, the sensing device 140) can be based on one or more of a number of factors. For example, communications can be based on an algorithm or formula set forth in software and/or hardware within one or more components of the system. As another example, communications can be based on events associated with a LV device 180 or component of the system. Such events can include, but are not limited to, light intensity, an emergency condition, demand response, passage of time, and a time sweep.

Communications between the PDM 120, the controller 190, and/or a LV device 180 (e.g., a secondary power source 125, the troffer lights 130, the can lights 150, the controller 190, the sensing device 140) can be made through the LV cables 104 and/or the communication link 106, using wired and/or wireless technology. Similarly, as discussed above, line power and/or LV signals can be transmitted between the PDM 120, the controller 190, and/or a LV device 180 using communication links 106, which can include wired and/or wireless technology.

FIG. 2 shows a system diagram of another hybrid distributed low voltage power system 200 in accordance with certain example embodiments. Specifically, the system 200 of FIG. 2 is substantially the same as the system 100 of FIG. 1A, except that there are two secondary power sources, secondary power source 225A and secondary power source 225B. In this case, the output of each secondary power source 225 is directly coupled to a downstream device rather than to the PDM 220. Specifically, the output of the secondary power source 225A is coupled to the first in a series of troffer lights 230 and a photocell/timer 241, and the output of the secondary power source 225B is coupled to the first in a series of sensing devices 240 and troffer lights 230.

Also, as shown in FIG. 2, the secondary power sources receive line voltage power from a primary power source, convert the line voltage power to LV power, and send the LV power to the downstream devices to which they are coupled using LV cables 204. In this case, primary power source 210A delivers line voltage power to both the PDM 220 and the secondary power source 225A, and primary power source 210C delivers line voltage power to secondary power source 225B. Each secondary power source 225 can store the line voltage power prior to converting the line voltage power to LV power, and/or each secondary power source 225 can convert the line voltage power to LV power and subsequently store the LV power prior to sending the LV power to the downstream devices.

The PDM 220 can communicate with each secondary power source 225 using one or more communication links 206. In this way, the PDM 220 can control one or more aspects of the operation of each secondary power source 225. For example, the PDM 220 can use the communication links 206 to direct one or both of the secondary power sources 225 in FIG. 2 to stop receiving input power from its respective primary power source 210 and/or release the power stored in its respective storage component 226 so that LV power can be delivered to the downstream devices.

Figure 3:
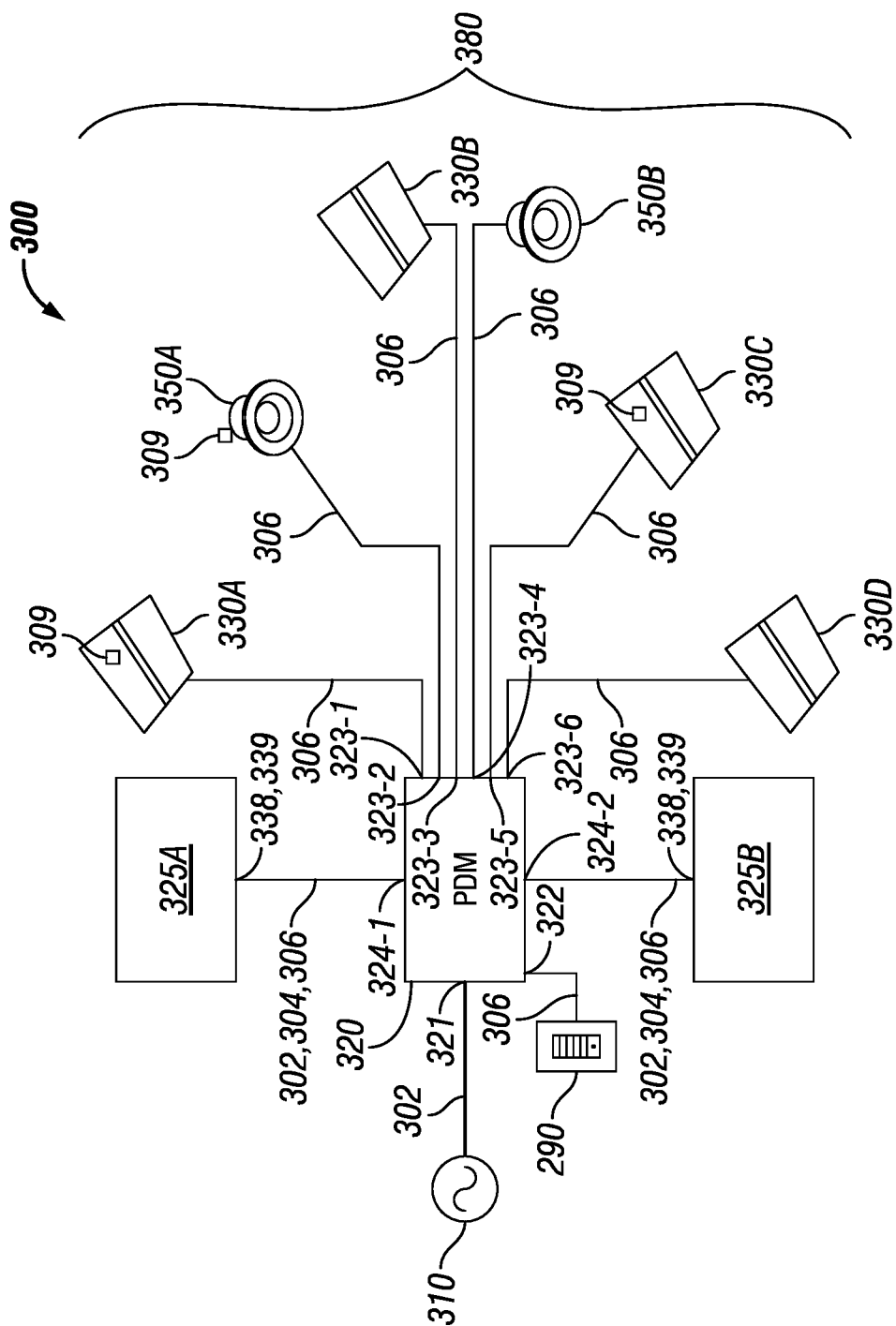
FIG. 3 shows another system diagram of another hybrid distributed low voltage power system in accordance with certain example embodiments.

FIG. 3 shows another system diagram of another hybrid distributed low voltage power system 300 in accordance with certain example embodiments. The system 300 of FIG. 3 is substantially like the system 200 of FIG. 2, except as described below. In this case, the PDM 320 of FIG. 3 is a POE switch. As such, only a single LV device 380 is coupled to an output channel 323 of the PDM 320. Further, communication links 306 (e.g., Ethernet cables) rather than LV cables are used to couple an output channel 323 of the PDM 320 to a LV device 380. In some cases, multiple LV devices 380 can be coupled, in series and/or in parallel, with a single output channel 323 of the PDM 320.

In this case, troffer light 330A is coupled to output channel 323-1 of the PDM 320 using a communication link 306. Can light 350A is coupled to output channel 323-2 of the PDM 320 using a communication link 306. Troffer light 330B is coupled to output channel 323-3 of the PDM 320 using a communication link 306. Can light 350B is coupled to output channel 323-4 of the PDM 320 using a communication link 306. Troffer light 330C is coupled to output channel 323-5 of the PDM 320 using a communication link 306. Troffer light 330D is coupled to output channel 323-6 of the PDM 320 using a communication link 306.

Further, in this example, there is no direct coupling between the primary power source 310 and the two secondary power sources 325 (in this case, secondary power source 325A and secondary power source 325B). Instead, the primary power source 310 sends the line voltage power to the PDM 320 through the line voltage cables 302. Once the line voltage power is received by the PDM 320, some of that line voltage power is used by the PDM 320 to generate the one or more LV signals. The rest of the line voltage power (as well as one or more other signals, such as communication signals) can be distributed to the secondary power source 325A and/or the secondary power source 325B using line voltage cables 302, LV cables 304, and/or communication links 306.

Alternatively, once the PDM 320 receives the line voltage power from the primary power source 310, the PDM 320 can send some other signal (e.g., a LV signal) to one or both of the secondary power sources 325, which can be used by the secondary power sources 325 to store and eventually generate reserve signals. In this example, there is also no direct link between the two secondary power sources 325 and any of the LV devices 380. In some cases, if a secondary power source 325 is directly coupled to one or more LV devices 380, then the secondary power source 325 can include one or more components of the PDM 320, including but not limited to a power transfer device. In such a case, the secondary power source 325 can generate and send reserve LV signals to the LV devices 380 when delivery of the line voltage power from the primary power source 310 is interrupted.

Example embodiments provide a number of benefits. Examples of such benefits include, but are not limited to, reduction in energy usage; simplistic integration into existing systems lacking a secondary power source, simplified maintenance; qualification as a Class 2 device and/or system; compliance with one or more applicable standards and/or regulations; less need for licensed electricians; reduced downtime of equipment; lower maintenance costs; prognosis of equipment failure; improved maintenance planning; and reduced cost of labor and materials. Example embodiments can also be integrated (e.g., retrofitted) with existing systems.

Example embodiments are electrically safe. Example systems or any portion thereof can be free from risk (or a greatly reduced risk) of fire or electrical shock for any user installing, using, replacing, and/or maintaining any portion of example embodiments. For example, the LV signals that feed a device can allow a user to maintain the device without fear of fire or electrical shock. While Class 2 systems and SELV/PELV/FELV are described above, example embodiments can comply with one or more of a number of similar standards and/or regulations throughout the world. Example embodiments can be used to implement intelligent predictive load management strategies.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A hybrid distributed low voltage power system, comprising:
a first primary power source that distributes line voltage power during a first mode of operation and fails to distribute the line voltage power during a second mode of operation, wherein the first mode of operation occurs when an operational factor meets an acceptable condition, and wherein the second mode of operation occurs when the operational factor meets an unacceptable condition;
a first secondary power source that receives an input signal during the first mode of operation and distributes a reserve signal during the second mode of operation, wherein the reserve signal is generated from the input signal;
a power distribution module (PDM) coupled to the first primary power source and the first secondary power source, wherein the PDM comprises a first power transfer device and a first output channel, wherein the PDM receives the line voltage power from the first primary power source during the first mode of operation, and wherein the first power transfer device generates a first low-voltage (LV) signal using the line voltage power during the first mode of operation; and
at least one first LV device coupled to the first output channel of the PDM, wherein the at least one LV device operates using the first LV signal generated by the PDM during the first mode of operation, and wherein the at least one first LV device receives a reserve LV signal based on the reserve signal during the second mode of operation,
wherein the LV signal is up to 100 VAC or up to 60 VDC, and
wherein the input signal is generated by the primary power source or the PDM.

2. The hybrid distributed low voltage power system of claim 1, wherein the operational factor comprises load control, wherein the acceptable condition comprises the at least one first LV device using an amount of power that falls below a threshold value, and wherein the unacceptable condition comprises the at least one first LV device using an amount of power that exceeds the threshold value.

3. The hybrid distributed low voltage power system of claim 1, wherein the operational factor comprises compliance with an energy efficiency standard, wherein the acceptable condition comprises the at least one first LV device using an amount of power that contributes to compliance with the energy efficiency standard, and wherein the unacceptable condition comprises the at least one first LV device using an amount of power that contributes to non-compliance with the energy efficiency standard.

4. The hybrid distributed low voltage power system of claim 1, wherein the operational factor comprises compliance with a certification standard for renewable and sustainable practices, wherein the acceptable condition comprises the at least one first LV device using an amount of power that contributes to compliance with the certification standard, and wherein the unacceptable condition comprises the at least one first LV device using an amount of power that contributes to non-compliance with the certification standard.

5. A hybrid distributed low voltage power system, comprising:
at least one first power source comprising an energy storage device, wherein the at least one first power source distributes first stored power during a first mode of operation and fails to distribute the first stored power during a second mode of operation, wherein the first mode of operation occurs when the at least one first power source has a first amount of the first stored power that is greater than a first threshold value, wherein the second mode of operation occurs when the at least one first power source has the first amount of the first stored power that falls below the first threshold value;
at least one second power source that provides reserve power during the second mode of operation;
a power distribution module (PDM) coupled to the at least one first power source and the at least one second power source, wherein the PDM comprises a power transfer device and a first output channel, wherein the PDM receives the first stored power from the at least one first power source during the first mode of operation, wherein the power transfer device generates a first low-voltage (LV) signal using the first stored power during the first mode of operation, wherein the PDM receives the reserve power during the second mode of operation, wherein the PDM generates the first LV signal using the reserve power during the second mode of operation; and at least one first LV device coupled to the first output channel of the PDM, wherein the at least one first LV device operates using the first LV signal generated by the PDM during the first mode of operation and the second mode of operation, wherein the LV signal is up to 100 VAC or up to 60 VDC.

6. The hybrid distributed low voltage power system of claim 5, wherein the at least one first power source is coupled to the at least one second power source, wherein the at least one first power source uses the reserve power to generate the stored power during the second mode of operation.

7. The hybrid distributed low voltage power system of claim 5, wherein the at least one first power source receives an input signal from PDM during the second mode of operation, wherein the at least one first power source uses the input signal to generate the stored power during the second mode of operation.

8. The hybrid distributed low voltage power system of claim 5, further comprising:

at least one second LV device coupled to a second output channel of the PDM; and at least one third power source coupled to the PDM, wherein the at least one third power source comprises a second energy storage device, wherein the at least one third power source distributes second stored power during the first mode of operation and fails to distribute the second stored power during the second mode of operation, wherein the first mode of operation occurs when the at least one third power source has a second amount of the second stored power that is greater than a second threshold value, wherein the second mode of operation occurs when the at least one third power source has the second amount of the second stored power that falls below the second threshold value, wherein the PDM receives the second stored power from the at least one third power source during the first mode of operation, wherein the power transfer device generates a third LV signal using the second stored power during the first mode of operation, wherein the at least one second LV device operates using the third LV signal during the first mode of operation, wherein the at least one second LV device operates using the second LV signal during the second mode of operation, and wherein the third LV signal is up to 100 VAC or up to 60 VDC.

9. The hybrid distributed low voltage power system of claim 5, wherein the at least one first power source further comprises a controller that distinguishes between the first mode of operation and the second mode of operation.

10. A hybrid distributed low voltage power system, comprising:

at least one first low voltage (LV) device;

at least one first power source coupled to the at least one first LV device, wherein the at least one first power source comprises a first energy storage device and a first power transfer device, wherein the first power transfer device generates a first LV signal using stored power from the energy storage device, wherein the at least one first power source distributes the first LV signal to at least one first LV device during a first mode of operation and fails to distribute the first LV signal to the at least one first LV device during a second mode of operation, wherein the first mode of operation occurs when the first energy storage device has a first amount of the stored power that is greater than a first threshold value, wherein the second mode of operation occurs when the first energy storage device has the first amount of the stored power that falls below the first threshold value;

at least one second power source that provides reserve power during the second mode of operation;

a power distribution module (PDM) coupled to the at least one second power source, wherein the PDM comprises a second power transfer device and a first output channel, wherein the PDM receives the reserve power from the at least one second power source during the second mode of operation, wherein the second power transfer device generates a second LV signal using the reserve power during the second mode of operation, wherein the PDM sends the second LV signal to the at least one LV device through the first output channel during the second mode of operation, wherein the at least one first LV device operates using the first LV signal during the first mode of operation, wherein the at least one first LV device operates using the second LV signal during the second mode of operation, and wherein the first LV signal and the second LV signal are up to 100 VAC or up to 60 VDC.

11. The hybrid distributed low voltage power system of claim 10, wherein the at least one first power source is coupled to the at least one second power source, wherein the energy storage device of the at least one first power source uses the reserve power to generate the stored power during the second mode of operation.

12. The hybrid distributed low voltage power system of claim 10, wherein the at least one first power source receives an input signal from PDM during the second mode of operation, wherein the energy storage device of the at least one first power source uses the input signal to generate the stored power during the second mode of operation.

13. The hybrid distributed low voltage power system of claim 10, further comprising:

at least one second LV device coupled to a second output channel of the PDM; and at least one third power source coupled to the at least one second LV device, wherein the at least one third power source comprises a second energy storage device and a second power transfer device, wherein the second power transfer device generates a third LV signal using stored power from the second energy storage device, wherein the at least one third power source distributes the third LV signal to at least one second LV device during the first mode of operation and fails to distribute the third LV signal to the at least one second LV device during the second mode of operation, wherein the first mode of operation occurs when the second energy storage device has a second amount of the stored power that is greater than a second threshold value, wherein the second mode of operation occurs when the second energy storage device has the second amount of the stored power that falls below the second threshold value, wherein the PDM further sends the second LV signal to the at least one second LV device through the second output channel during the second mode of operation, wherein the at least one second LV device operates using the third LV signal during the first mode of operation, wherein the at least one second LV device operates using the second LV signal during the second mode of operation, and wherein the third LV signal is up to 100 VAC or up to 60 VDC.

14. The hybrid distributed low voltage power system of claim 10, wherein the at least one first power source further comprises a controller that determines the first amount of the stored power in the first energy storage device.

15. The hybrid distributed low voltage power system of claim 14, wherein the controller allows the first energy storage device to receive the reserve power from the at least one second power source during the first mode of operation when the first amount exceeds the first threshold value.

16. The hybrid distributed low voltage power system of claim 15, wherein the controller prevents the first energy storage device from receiving the reserve power during the first mode of operation when the first amount reaches a maximum value.

17. The hybrid distributed low voltage power system of claim 16, wherein the controller allows the first energy storage device to resume receiving the reserve power during the first mode of operation when the first amount falls below a normal operating level, wherein the normal operating level is less than the maximum value and greater than the first threshold value.

18. The hybrid distributed low voltage power system of claim 10, wherein the at least one second power source comprises photovoltaic solar generation.

19. The hybrid distributed low voltage power system of claim 10, wherein the at least one second power source comprises wind-powered generation.

20. The hybrid distributed low voltage power system of claim 10, wherein the at least one second power source comprises a fuel cell.

* * * * *